Dec. 13, 1966   G. S. ALLISON   3,291,870
METHOD OF FABRICATING A MULTICHANNEL NUCLEAR FUEL ELEMENT
Filed June 12, 1964
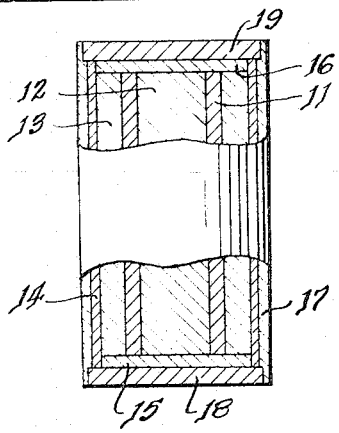
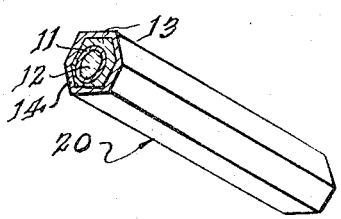
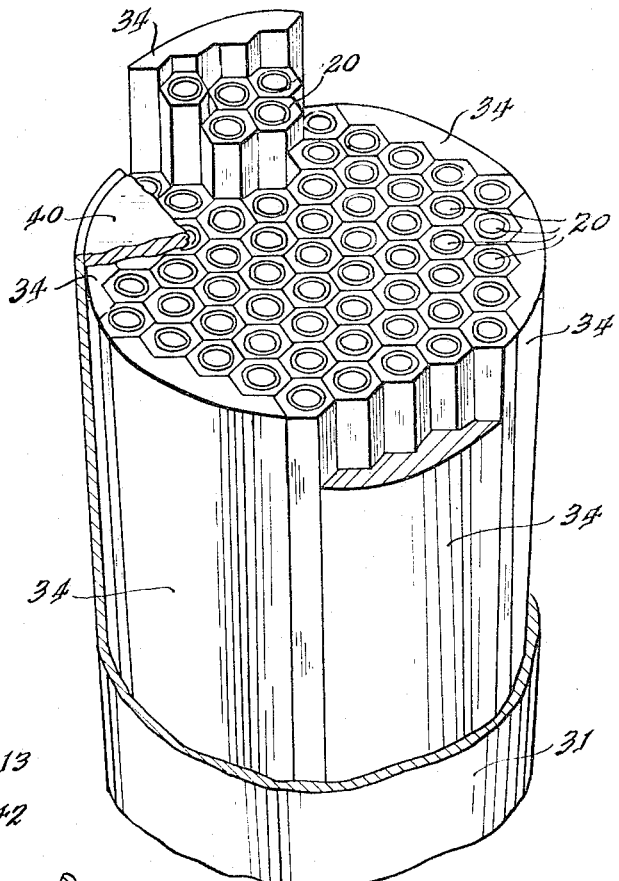
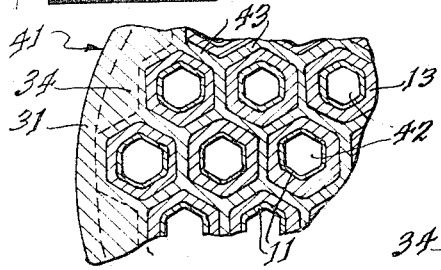
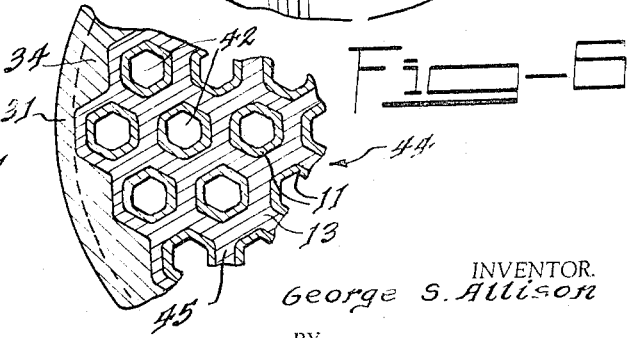
INVENTOR.
George S. Allison
BY
Attorney

United States Patent Office 3,291,870
Patented Dec. 13, 1966

3,291,870
METHOD OF FABRICATING A MULTICHANNEL NUCLEAR FUEL ELEMENT
George S. Allison, Richland, Wash., assignor to the United States of America as represented by the United States Atomic Energy Commission
Filed June 12, 1964, Ser. No. 374,855
4 Claims. (Cl. 264—.5)

The invention described herein was made in the course of, or under, a contract with the U.S. Atomic Energy Commission.

The invention relates to a method of forming multichannel objects, more particularly of making nuclear reactor fuel elements consisting of intimately bonded bundles of thin-walled tubes. The invention includes the method of making components of the bundles, and the products of the method.

As the art of nuclear reactor design advances demand increases for fuel elements with improved heat transfer characteristics. To bring this about fuel elements with a plurality of thin-walled coolant channels have been suggested because of the high surface to volume ratio, but no method has been found of fabricating these which gives a reliable product and is not unduly expensive. This is particularly true when refractory metals are used to line the coolant channels, which is unfortunate since metals of this kind have much to recommend them for this purpose, especially zirconium and tungsten and their alloys. Furthermore, thin-walled multi-channel shapes in general would be used more widely for such purposes as heat exchangers, if they could be made to give reliable service at a reasonable price.

It is, accordingly, the general object of the invention to provide a method of making thin-walled multichannel shapes.

It is a more particular object to provide a method of making nuclear fuel elements with a plurality of thin-walled coolant channels.

It is a still more particular object to provide a method of making nuclear fuel elements with a plurality of thin-walled coolant channels of refractory metals and alloys.

Other objects will appear as the description proceeds.

According to the invention a plurality of corrosion-resistant tubes is solidly filled with material which can be chemically disintegrated by a reagent to which the tubes are less reactive, hereinafter called a sacrificial material. The tubes are then nested together in a close-packed configuration which is surrounded by a closely fitting sleeve; the sleeve with its contents is then reduced in diameter to a degree that the material of the tubes bond together to give an intimately bonded bundle of tubes. The bundle is converted into a multichannel shape by chemically removing the sacrificial material from the bore of the tubes. Any one of a number of diameter-reducing methods may be used, including die-extrusion, die-drawing, swaging or a combination of these.

To fabricate a multichannel nuclear fuel element a plurality of corrosion-resistant tubes filled with sacrificial material are first coated on the outside with nuclear material such as natural or enriched uranium metal; or alternatively, the tubes may be inserted into closely fitting external tubes of nuclear material. They are then nested together, surrounded by a closely fitting sleeve and reduced in diameter. The metallic nuclear material bonds together to form a bundle, and this is converted into a multichannel fuel element by removing the sacrificial material from the bore of the tubes by chemical means. Other shapes, such as a heat exchanger, may be formed in the same way, the nuclear material, of course, being omitted.

An improved product may be made if the tubes, or components of the configuration, or bundle, are first reduced into another cross-sectional shape before being nested together, rather than merely being left round. Of the various possible shapes the hexagonal is preferred. This permits the components to be nested together in a honeycomb configuration which can then be rounded out into a perfectly circular shape in cross-section by adding some comparatively small filler, or transition, shapes. The circular bundle will then fit exactly into an outer sleeve, and when this assembly is reduced in diameter the honeycomb configuration will hold distortion of the tubes to a minimum.

A preferred embodiment of the invention includes a second, or outer, tube of corrosion-resistant material closely surrounding the nuclear material on each of the components of the bundle. Among other advantages, this makes it possible to use ceramic and cermet nuclear material such as $UO_2$ rather than metallic. The bonding together is done by the metal of the outer tubes, while the inner tubes protect the ceramic or cermet fuel from the corrosive action of the coolant. Together the two tubes further serve to contain fission products generated during the operation of the reactor. Tungsten is the preferred material for both the sets of tubes, but, of course, other metals and alloys could be used such as aluminum, aluminum alloys, zirconium, zirconium alloys, stainless steel and, in the case of organic reactors, carbon steel.

As has already been indicated, it is always necessary to reduce the diameter of the bundle of components within its sleeve, and preferably to reduce that of the components individually beforehand, not only to bond the components together, but to give them a hexagonal shape so that they can be arranged in a honeycomb bundle and thus better withstand the distortional forces of the second, or bundle, diameter reduction. In either of these cases it is preferable to cover the object being extruded, component or bundle, with a highly ductile material such as copper, usually in the form of a copper can. Heat should be employed to raise the object to extrusion or drawing temperature. Of the various methods of diameter reduction, extrusion through a die is usually preferable in most cases, although swaging becomes so in the later stages after the diameter of the bundle becomes less than about one inch.

When the components of the bundle are first individually reduced to the hexagonal shape the inner tubes usually retain their circular cross-section; they also remain quite circular through the first and even several of the earlier reductions of the bundle. However, when the diameter of the bundle is further reduced, the inner tubes begin to distort somewhat, and if it is reduced far enough the inner tubes themselves take on a roughly hexagonal shape and the whole assembly looks like a honeycomb. Removal of the sacrificial material results in a honeycomb-like array of approximately hexagonal channels. Nevertheless, by means of our sacrificial material, which will now be described, this distortion is controlled and does not seriously affect the integrity of the channels.

It may sound surprising to hear uranium designated as a sacrificial material for carrying out the invention, but, nevertheless, it is the material of choice for fabricating fuel elements, especially when the nuclear material is also metallic uranium or a cermet of ceramic fuel in uranium. When the diameter of such a component or bundle is being reduced, the distortion of the coolant tubes is greatly minimized because the extrusion or other metal-working characteristics of the material on both sides is exactly, or almost exactly, the same. While uranium is looked upon as expensive, and justly so, its use in the way indicated here is well justified by the even balance which it gives to the forces on both sides of the tube during the diameter reductions. Of course, for this purpose only natural uranium should be used; enriched uranium should only be used as nuclear fuel material.

In addition to uranium, other sacrificial materials could be used, such as zinc, magnesium, iron, molybdenum and other metals which are easily removed by mineral acids. Aluminum could be used and removed by alkali as well as by acids which is also true of other amphoteric metals such as zinc. Nonmetallic materials can sometimes be used; chalk is suitable when the tubes are of magnesium or aluminum.

Examples of ceramic fuels are the oxides, carbides, nitrides, sulfides and other such compounds of the actinide elements uranium and plutonium. These may be used alone, in mixtures with other ceramics, or in cermets with matrix metals. Matrix metals may be aluminum, aluminum alloys, zirconium, zirconium alloys, stainless steels, carbon steel, uranium and uranium alloys.

Attention is now directed to the drawing, FIG. 1 of which is a broken-away view of a composite component of the preferred embodiment above mentioned of a component of a nuclear fuel element immediately before being extruded.

FIG. 2 is a perspective view of the component shown in FIG. 1, after extrusion.

FIG. 3 is a broken-away view of a multichannel nuclear reactor fuel element in the process of being assembled according to the invention.

FIG. 4 is a cross-sectional view of the completed fuel element of the invention.

FIG. 5 is an enlarged fragmentary view of a portion of FIG. 4.

FIG. 6 is a view similar to FIG. 5, but showing a modified fuel element of the invention.

Referring to FIG. 1, a component is provided which comprises an inner coolant tube 11 of corrosion-resistant material, in this case Zircaloy-2, solidly filled with sacrificial material 12, natural uranium. The composition of Zircaloy-2 is set forth in Reactor Handbook, 2nd ed., Interscience Publishers, Inc., New York, 1960, vol. 1, p. 709. On the outer surface of coolant tube 11 is a layer of nuclear material 13, metallic uranium. On the outer surface of nuclear material 13 is corrosion-resistant outer tube 14, also of Zircaloy-2, and on each end Zircaloy-2 caps 15 and 16. The aforementioned parts of the component are round. The component is enclosed by, and vacuum sealed in, a copper can consisting of sidewall 17, bottom 18 and top 19. The component and can are heated to extrusion temperature and extruded through a hexagonal die; the copper can is removed, and the ends of the component cut off just above cap 15 and below cap 16, thus exposing the ends of sacrificial material 12.

Referring to FIG. 2, the resultant product is an element 20, which is a cylinder having the cross section of a regular hexagon. The element 20 is formed of the parts 11, 12, 13, and 14 of the aforementioned component, which parts have been elongated and reduced in diameter. Moreover, the outer tube 14 of the element 20 has become hexagonal, whereas the inner tube 11 thereof remains generally round.

As shown in FIG. 3, a plurality of elements 20 is being arranged in a honeycomb configuration or bundle of the general shape of a regular hexagon within a sleeve 31, of corrosion-resistant material, in this case, of Zircaloy-2. Because of the scale of FIG. 3, the outer tubes 14 of the elements 20 are not shown. It will be noted that the particular configuration shown consists of 61 elements 20 arranged in nine rows varying progressively in number by one from five to nine and back to five. The sleeve 31 is of such a size that it engages the six elements 20 at the corners of the hexagon in which the 61 elements are arranged. Six fillers, or transition, pieces 34 fill the void spaces between the sleeve 31 and the six sides of the hexagonal bundle of elements. Each piece 34 is arcuate on one side to conform to the interior of sleeve 31 and serrated on the other side to conform to the elements 20 on the adjacent side of the hexagonal bundle. An end cap is shown at 40, most of it having been broken away in order to make the honeycomb configuration of the components 10 visible. A corresponding end cap at the bottom (not shown) completes the assembly. The end caps and the transition pieces 34 are of the same material as the sleeve 31, Zircaloy-2. The assembly is vacuum-sealed in a copper can (not shown), and the assembly and can are heated to extrusion temperature and subjected to die extrusion, which elongates them and reduces them in diameter.

Upon removal of the copper can, the end caps 40, and the sacrificial uranium 12, the resultant product is a round cylindrical fuel element 41, which, as shown in FIGS. 4 and 5, has a plurality of generally hexagonal coolant passages 42 formed from the inner tubes 11 by removal of the sacrificial uranium 12 therefrom. The inner tubes 11 have become generally hexagonal, and the fuel tubes 13 surrounding them have also become hexagonal. The outer tubes 14 have become bonded into a hexagonal web or honeycomb 43 which is bonded to the transition pieces 34 and sleeve 31. The transition pieces and sleeve have become bonded to one another.

As shown in FIG. 6, a modified fuel element 44, formed by the process of the present invention, is round and cylindrical and has generally hexagonal coolant passages 42 formed in generally hexagonal tubes 11 and a fuel web or honeycomb 45 enclosing them. The fuel element 44 is obtained by the process disclosed in FIGS. 1–5 modified by the omission of the outer tube 14 from the component of FIG. 1. This means that the fuel sleeve 13 is at the outside of the component at the stage of FIG. 1 as well as at the outside of the elements at the stage of FIG. 3. Thus, the fuel sleeves 13 become bonded to one another to form the fuel web 45, which becomes bonded to the sleeve 31 and the transition pieces 34. The sleeve and transition pieces become bonded to one another.

*Example I*

Zircaloy-2 tubes with an outer diameter of 2.125 inches and a wall thickness of .066 inch were solidly filled with uranium cores 1.980 inches in diameter, and capped with Zircaloy-2 end caps. They were then electron-beam-sealed in vacuo in cans of pure copper with a wall thickness of .035 inch, 2.24 inches in outer diameter. These assemblies were then heated to about 620° C. and individually extruded through a round die 0.350 inch in diameter and swaged to 0.300 inch in diameter, and the copper cans were removed. The components were then cut to length and bright-etched.

112 components so fabricated were gathered into a bundle and inserted into a tightly fitting round shell of Zircaloy-2, and this bundle was then electron-beam-sealed in vacuo in a tightly fitting pure copper can four inches in diameter. This assembly was heated to about 620° C. and extruded through a round die 1.030 inches in diameter. The copper can was removed; the bundle was immersed in $HNO_3$ until the uranium was dissolved completely, rinsed in water and dried. The result was an elongated shape, 7 feet long, about one inch in diameter, and having on its inside a web of fully bonded cells, 112 in number and arranged in an approximately honeycomb configuration.

*Example II*

A fuel element 41 was fabricated as shown in FIGS. 1–5. Each of the individual starting components, or billets, had a Zircaloy-2 outer tube 14 having an outer diameter of 2.130 inches and a .047-inch wall thickness, a tube 13 of fuel uranium having an outer diameter of 2.026 inches and a 0.223-inch wall thickness, a Zircaloy-2 coolant tube 11 having an outer diameter of 1.570 inches and a 0.130-inch wall thickness, a solid sacrificial uranium core 12, 1.300 inches in diameter, and Zircaloy-2 end caps 15 and 16. Each component was electron-beam-sealed in vacuo in a pure copper can having an outer diameter of 2.240 inches and a side wall thickness of 0.035 inch, heated to about 620° C. and extruded through a hexagonal die 0.426 inch in diameter. The components were then cut to length, stripped of copper with $HNO_3$, bright-etched with an etchant solution of 5 percent HF and the balance $HNO_3$, rinsed in water and dried.

Sixty-one of the elements 20 so fabricated were arranged in a honeycomb configuration as shown in FIG. 3 within a Zircaloy-2 sleeve 31 with an outer diameter of 3.900 inches and a .100-inch wall thickness. Six Zircaloy-2 transition pieces 34 were added to fill the void spaces between the sleeve 31 and elements 20, and end caps 40 were placed on the top and bottom and welded to the sleeve 31. The bundle assembly thus made was electron-beam-sealed in vacuo into a pure copper can having an outer diameter of 4.000 inches and a .042-inch wall thickness; the assembly was then heated to about 620° C. and extruded through a circular die about 1.030 inches in diameter.

The assembly was then cut into lengths and counterbored $\frac{3}{32}$ inch deep on each end leaving a wall of Zircaloy-2 cladding. The copper was then stripped with $HNO_3$ and the uranium of both the fuel layer 13 and the sacrificial core 12 was removed to a depth of $\frac{1}{32}$ inch with $HNO_3$. The ends of the coolant tubes 11 were sealed with polyvinyl chloride and the exposed uranium of 13 was further removed to a depth of $\frac{3}{32}$ inch. The polyvinyl chloride was removed and the entire faces of both ends were brazed with an alloy consisting of 5% by weight Bé. and the balance Zr. A facing cut $\frac{1}{32}$ inch deep was then made, with a lathe, across each end, thus bearing the uranium 12, but leaving uranium 13 covered by the braze alloy. The sacrificial uranium cores 12 were then removed by immersing the assembly in HCl, after which the completed fuel element was bright-etched in the same etching solution as described above, rinsed in water and dried.

*Example III*

A fuel element fabricated according to Example II was heated to about 500° C. and swaged in steps down to a .250-inch diameter. No difficulties were encountered and the geometry of the piece remained essentially the same after the swaging. The integrity of the coolant channels was unaffected.

It will be understood that the invention is not to be limited to the details given herein but that it may be modified within the scope of the appended claims.

The embodiments of the invention in which an exclusive property or privilege is claimed are defined as follows:

1. A method of making a multichannel fuel element, comprising closely surrounding a plurality of right circular cylindrical first tubes of gas-tight, corrosion-resistant metal with coaxial tubes of fissionable material, solidly filling the interior of the first tubes with sacrificial metal to form a plurality of components, sealing each of the said components in a tight-fitting copper container, heating the sealed container to extrusion temperature, converting each of the components to a hexagonal shape of smaller diameter than that of the copper container, removing the copper container, arranging the plurality of components thus reduced in diameter into a close-packed honeycomb configuration of hexagonal shape, surrounding the configuration with a close-fitting sleeve of fluid-tight, corrosion-resistant metal, filling the vacant volumes between the sleeve and the configuration with transition shapes, sealing the sleeve and its contents in a second copper container, heating the assembly thus formed within the said second container to extrusion temperature, extruding the said assembly through a round die of smaller diameter than that of the assembly, removing the copper container, covering the exposed ends of the nuclear material with chemically inert material and removing the sacrificial material by chemical means.

2. The method of claim 1 where the tubes of fissionable material are closely externally surrounded by second tubes of gas-tight, corrosion-resistant metal.

3. The method of claim 1 where the sacrificial material is uranium.

4. The method of claim 2 where the corrosion-resistant material is selected from the class consisting of zirconium, zirconium alloys, tungsten, tungsten alloys, aluminum, aluminum alloys, stainless steel and carbon steel.

References Cited by the Examiner

UNITED STATES PATENTS

| | | | |
|---|---|---|---|
| 2,499,977 | 3/1950 | Scott | 29—423 X |
| 2,619,438 | 11/1952 | Varian et al. | 29—423 X |
| 2,969,312 | 1/1961 | Monson | 176—90 X |
| 3,004,907 | 10/1961 | Precht et al. | 176—83 |
| 3,222,144 | 12/1965 | Davenport | 264—0.5 X |

FOREIGN PATENTS 700,812   12/1953   Great Britain.

CARL D. QUARFORTH, *Primary Examiner.*

L. DEWAYNE RUTLEDGE, *Examiner.*